US008725679B2

(12) United States Patent
Nair et al.

(10) Patent No.: US 8,725,679 B2
(45) Date of Patent: May 13, 2014

(54) CLIENT SIDE CACHING OF SYNCHRONIZED DATA

(75) Inventors: Nisha K. Nair, Mountain View, CA (US); Dinesh Nirmal, San Jose, CA (US); Sandhya C. Turaga, San Jose, CA (US); David J. Wisneski, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 12/098,706

(22) Filed: Apr. 7, 2008

(65) Prior Publication Data

US 2009/0254589 A1 Oct. 8, 2009

(51) Int. Cl.
*G06F 17/30* (2006.01)

(52) U.S. Cl.
USPC .......................................... 707/608; 707/612

(58) Field of Classification Search
USPC ............ 707/999.01, 610, 631, 628, 635, 608, 707/612; 709/203, 223, 202, 227; 705/4; 717/101
See application file for complete search history.

(56) References Cited

U.S. PATENT DOCUMENTS

| 6,988,241 | B1 | 1/2006 | Guttman et al. | |
| 7,233,951 | B1 | 6/2007 | Gainer et al. | |
| 7,240,054 | B2 * | 7/2007 | Adiba et al. | 1/1 |
| 7,467,198 | B2 * | 12/2008 | Goodman et al. | 709/223 |
| 7,627,658 | B2 * | 12/2009 | Levett et al. | 709/223 |
| 7,676,562 | B2 * | 3/2010 | Reistad et al. | 709/223 |
| 2002/0129054 | A1 | 9/2002 | Ferguson et al. | |
| 2002/0133509 | A1 | 9/2002 | Johnston et al. | |
| 2002/0138624 | A1 * | 9/2002 | Esenther | 709/227 |
| 2003/0009563 | A1 | 1/2003 | Douglis et al. | |
| 2000/3014502 | | 7/2003 | Parkkinen | |
| 2003/0145021 | A1 | 7/2003 | Parkkinen | |
| 2004/0015504 | A1 * | 1/2004 | Ahad et al. | 707/100 |
| 2004/0068505 | A1 * | 4/2004 | Lee et al. | 707/100 |
| 2004/0117439 | A1 * | 6/2004 | Levett et al. | 709/203 |
| 2004/0148307 | A1 | 7/2004 | Rempell | |
| 2004/0148375 | A1 * | 7/2004 | Levett et al. | 709/223 |

(Continued)

OTHER PUBLICATIONS

Haber, et al.,-IBM Almaden Research Center, A1: Spreadsheet-based Scripting for Developing Web Tools, 19th Large Installation System Administration Conference (LISA '05), pp. 197-208.

(Continued)

*Primary Examiner* — Albert Phillips, III
(74) *Attorney, Agent, or Firm* — Konrad Raynes Davda & Victor LLP; Janaki K. Davda

(57) ABSTRACT

A method for synchronizing a database with data stored at a client includes providing a data feed to receive data by the client from the database and provide received data, caching the received data in a client side cache to provide client side cached data, detecting a database change to data within the database corresponding to the client side cached data according to a polling operation to provide a change event, pushing the change event to the client side cached data to update the client side cached data in accordance with the database change and the polling operation, requesting further data from the database, determining whether the further data includes data of the client side cached data to determine remaining data exclusive of the client side cached data and pushing the remaining data to the client side cached data.

15 Claims, 7 Drawing Sheets

(56) References Cited

U.S. PATENT DOCUMENTS

| | | |
|---|---|---|
| 2004/0148444 A1 | 7/2004 | Thomas et al. |
| 2004/0237045 A1 | 11/2004 | Meltzer |
| 2005/0049945 A1 | 3/2005 | Bourbonnais et al. |
| 2005/0055382 A1 | 3/2005 | Ferrat et al. |
| 2005/0102310 A1 | 5/2005 | Marr et al. |
| 2005/0188353 A1 | 8/2005 | Hasson et al. |
| 2005/0228812 A1 | 10/2005 | Hansmann et al. |
| 2005/0246395 A1 | 11/2005 | Sevilla |
| 2005/0257132 A1 | 11/2005 | Karby |
| 2005/0267921 A1 | 12/2005 | Bali et al. |
| 2006/0004794 A1 | 1/2006 | Pizzo et al. |
| 2006/0004923 A1 | 1/2006 | Cohen et al. |
| 2006/0010165 A1 | 1/2006 | Gee |
| 2006/0015817 A1 | 1/2006 | Fioretti et al. |
| 2006/0015842 A1 | 1/2006 | DeSantis |
| 2006/0041831 A1 | 2/2006 | Cho et al. |
| 2006/0053425 A1* | 3/2006 | Berkman et al. ............. 719/313 |
| 2006/0070019 A1* | 3/2006 | Vishnumurty et al. ....... 717/101 |
| 2006/0167981 A1 | 7/2006 | Bansod et al. |
| 2006/0218206 A1 | 9/2006 | Bourbonnais et al. |
| 2006/0224634 A1 | 10/2006 | Hahn et al. |
| 2006/0259523 A1 | 11/2006 | Wallis et al. |
| 2006/0271510 A1* | 11/2006 | Harward et al. ................... 707/2 |
| 2007/0022155 A1* | 1/2007 | Owens et al. ................. 709/202 |
| 2007/0088709 A1* | 4/2007 | Bailey et al. ..................... 707/10 |
| 2007/0100834 A1 | 5/2007 | Landry et al. |
| 2007/0130177 A1 | 6/2007 | Schneider et al. |
| 2007/0130541 A1* | 6/2007 | Louch et al. ................... 715/804 |
| 2007/0157304 A1 | 7/2007 | Logan et al. |
| 2007/0162504 A1 | 7/2007 | Chivukula et al. |
| 2007/0174419 A1 | 7/2007 | O'Connell et al. |
| 2007/0185935 A1 | 8/2007 | Olivieri et al. |
| 2007/0208992 A1* | 9/2007 | Koren ............................ 715/503 |
| 2007/0233811 A1 | 10/2007 | Rochelle et al. |
| 2008/0046437 A1 | 2/2008 | Wood |
| 2008/0183844 A1* | 7/2008 | Gavin et al. ................... 709/217 |
| 2009/0055464 A1 | 2/2009 | Multer et al. |
| 2009/0070388 A1 | 3/2009 | Kolke et al. |
| 2009/0106052 A1* | 4/2009 | Moldovan ......................... 705/4 |
| 2009/0210459 A1 | 8/2009 | Nair et al. |

OTHER PUBLICATIONS

Amendment 3, Jan. 16, 2013, for U.S. Appl. No. 12/033,156, filed Feb. 19, 2008 by N.K. Nair et al., Total 7 pp. [57.266 (Amend3)].

Office Action 1, May 26, 2010, for U.S. Appl. No. 12/033,156, filed Feb. 19, 2008 by N.K. Nair et al., Total 30 pp. [57.266 (OA1)].

Amendment 1, Jul. 29, 2010, for U.S. Appl. No. 12/033,156, filed Feb. 19, 2008 by N.K. Nair et al., Total 13 pp. [57.266 (Amend1)].

Final Office Action 1, Oct. 13, 2010, for U.S. Appl. No. 12/033,156, filed Feb. 19, 2008 by N.K. Nair et al., Total 25 pp. [57.266 (FOA1)].

Amendment 2, Nov. 17, 2010, for U.S. Appl. No. 12/033,156, filed Feb. 19, 2008 by N.K. Nair et al., Total 9 pp. [57.266 (Amend2)].

Advisory Action, Dec. 3, 2010, for U.S. Appl. No. 12/033,156, filed Feb. 19, 2008 by N.K. Nair et al., Total 3 pp. [57.266 (AdvAct)].

Office Action 2, Oct. 1, 2012, for U.S. Appl. No. 12/033,156, filed Feb. 19, 2008 by N.K. Nair et al., Total 16 pp. [57.266 (OA2)].

Amendment 4, filed Aug. 5, 2013, for U.S. Appl. No. 12/033,156, filed Feb. 19, 2008 by N.K. Nair et al., Total pp. [57.266 (Amend4)].

Final Office Action 2, mailed May 6, 2013, for U.S. Appl. No. 12/033,156, 24 pp. [57.266 (FOA2)].

Notice of Allowance 1, mailed Sep. 25, 2013, for U.S. Appl. No. 12/033,156, 25 pp. [57.266 (NOA1)].

U.S. Appl. No. 14/144,251, filed Dec. 30, 2013, entitled "Document Synchronization Solution", invented by N.K. Nair et al., 25 pp. [57.266C1 (Appln)].

Preliminary Remarks, filed Dec. 30, 2013, for U.S. Appl. No. 14/144,251, filed Dec. 30, 2013, entitled "Document Synchronization Solution", invented by N.K. Nair et al., pp. 1 [57.266C1].

* cited by examiner

CLIENT SIDE CACHING OF SYNCHRONIZED DATA

BACKGROUND OF THE INVENTION

1. Field of Invention

This invention relates to the field of the synchronization of documents and, more particularly, the synchronization of a document displaying data stored in a database.

2. Description of Related Art

It is useful for multiple users, usually at geographically distributed locations, to work on the same document at the same time. In order to permit collaboration of this type, changes made to the document by one user should be displayed to all of the other users on their individual views of the document. Thus, the view of the users collaborating on the document at the same time can be constantly synchronized.

The data used to populate the document can be stored anywhere. Preferably, it can be stored in a database such as an IBM DB2 database. Alternately, data can be keyed or pasted into the document, or entered into the document in any manner available. If the data is stored in a database the user initiating a collaboration session can load the data from the database, populate the document, invite additional users to join the session and begin working collaboratively with the invited users. Additional users can be invited to access and/or request access during the collaboration session and be admitted while the session is in progress, typically by the initiating user.

It is known in the art to provide systems permitting such collaboration and synchronization of documents. For example, GOOGLE provides GOOGLE Docs to permit groups of users to synchronize document collaboration in this manner using the internet and their web browsers. The data represented in the synchronized document can be stored in a database prior to a collaboration session. A user can read the data from the database to populate the document at the time the collaboration session begins.

BRIEF SUMMARY OF THE INVENTION

A method for synchronizing a database with data stored at a client includes providing a data feed to receive data by the client from the database and provide received data, caching the received data in a client side cache to provide client side cached data, detecting a database change to data within the database corresponding to the client side cached data according to a polling operation to provide a change event, pushing the change event to the client side cached data to update the client side cached data in accordance with the database change and the polling operation, requesting further data from the database, determining whether the further data includes data of the client side cached data to determine remaining data exclusive of the client side cached data and pushing the remaining data to the client side cached data. The polling operation can be a long polling operation or a short polling operation.

The method also includes determining whether the further data includes data of the client side cached data, determining by a cache handler servlet and determining whether the further data includes of the client side cached data according to key/value pairs of the client side cached data. The received data can include summary data and detail data. Pushing the change event to the client side cached data by a synchronizer server, polling the synchronizer server by a polling servlet of the synchronizer server and updating the client side cached data by way of a data structure are also included. The data structure is a queue. The method also includes providing displayed document data according to the client side cached data, changing the displayed document data by a plurality of collaboration users to provide a plurality of collaboration changes and collaboration synchronizing the displayed document data by the client to provide a synchronized collaboration document wherein the synchronized collaboration document displays the collaboration changes of the plurality of collaboration changes.

A GOOGLE application program can synchronize the displayed document data. A JSOC can perform the caching of the received data. A JSON string can represent the data in the JSOC. The GOOGLE application program can be a spreadsheet application program. The method also includes pushing data of the synchronized collaboration document to the database, displaying the displayed document data in a browser, providing an HTTP save message by a collaboration user of the plurality of collaboration users, and pushing the data of the synchronized collaboration document in response to the HTTP save message. The change event is created in accordance with a feedname of the displayed document data.

BRIEF DESCRIPTION OF SEVERAL VIEWS OF THE DRAWINGS

Preferred embodiments of the invention will be described in conjunction with the following drawings in which like reference numerals designate like elements and wherein.

DETAILED DESCRIPTION OF THE INVENTION

Figure 1:
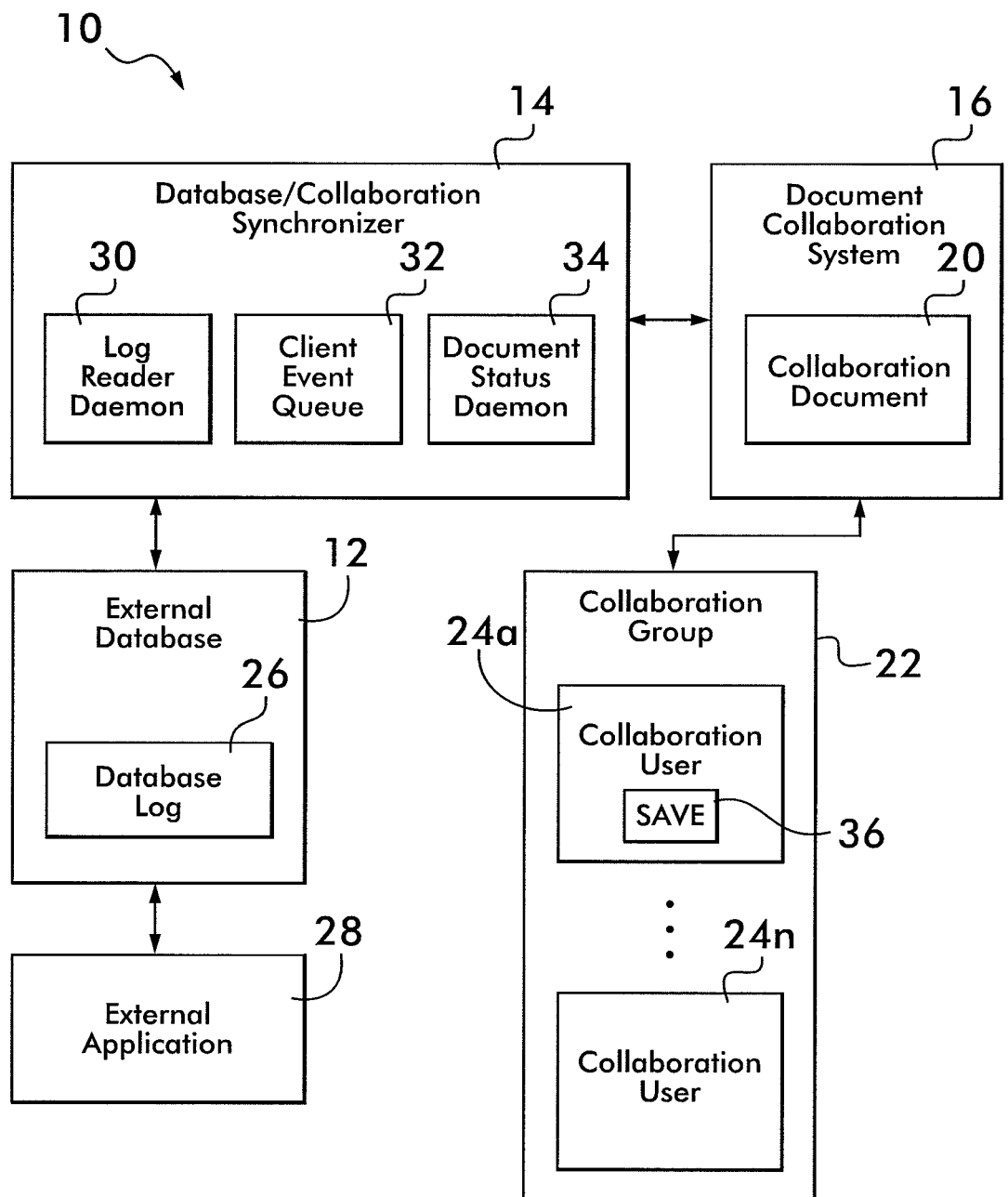
FIG. 1 is a block diagram overview of an embodiment of the document collaboration and synchronization solution.

Referring now to FIG. 1, there is shown an embodiment of document collaboration and synchronization solution 10. The document collaboration and synchronization solution 10 can access data stored in an external database 12, and display the accessed data as a collaboration document 20 in a document collaboration system 16. The document data comprising all or a portion of the collaboration document 20 can be transmitted from the external database 12 to the document collaboration system 16, by way of a database/collaboration synchronizer 14 having a client event queue 32.

The document collaboration system 16 can supervise the editing and synchronizing of the collaboration document 20 while the collaborating users 24a-n within a collaboration group 22 view and modify it. Thus, all of the collaborating users 24a-n of the collaboration group 22 can view a synchronized version of the collaboration document 20 during a collaboration session, within the document collaboration and synchronization solution 10. The collaborating users 24a-n can also save information they have changed during the collaboration session into the external database 12, by way of the database/collaboration synchronizer 14 during and/or after the collaboration session.

During a collaboration session an external application 28 can alter the data that is stored in the external database 12, while the document collaboration system 16 simultaneously displays the data as the collaboration document 20. The data of the collaboration document 20 can be displayed in a browser or in any other type of data display. Furthermore, the database/collaboration synchronizer 14 can detect the changes made by the external application 28 to the external database 12. Additionally, the database/collaboration synchronizer 14 can push the detected change events to the document collaboration system 16 during the collaboration session in order to update the collaboration document 20. The change events in the external database 12 can be propagated to the collaboration document 20 according to the URL of the collaboration document 20, the table names and the feednames of the data in the collaboration document 20, as described in more detail below.

In order to detect changes made to the external database 12 during a collaboration session, the database/collaboration synchronizer 14 can include a log reader daemon 30. The log reader daemon 30 can read a database log 26 within the external database 12. The database log 26 can keep track of all transactions involving changes to the data stored in the external database 12, including the data represented by the collaboration document 20.

Accordingly, the database/collaboration synchronizer 14 within the solution 10 can use the database log 26 and the log reader daemon 30 to detect changes to data stored in the external database 12 while the data is displayed in the collaboration document 20 within the document collaboration system 16. Furthermore, the database/collaboration synchronizer 14 can use the log reader daemon 30 to push the deleted change events to the collaboration document 20 during the collaboration session.

Thus, the collaborating users 24a-n can view and operate upon a collaboration document 20 that displays the changes made to the external database 12 during a collaboration session by the external application 28 on an on-going basis. Accordingly, the external application 28 can operate substantially like a virtual collaborating user 22a-n within the document collaboration and synchronization solution 10.

For example, the external database 12 can store the inventory information of a manufacturing company. The collaboration document 20 in the document collaboration system 16 can represent the inventory information as the inventory information is stored in the external database 12. The collaborating users 24a-n of the collaboration group 22 can be various groups within the manufacturing company that may need to use the inventory information. For example, the collaborating users 24a-n can be departments of the manufacturing company such as the accounting, marketing or sales departments. The external application 28 can be an application for updating the company inventory information stored in the external database 12 as the company manufactures new items and puts them into inventory, or as officials of the company remove items from the inventory.

Therefore, each of the collaborating users 24a-n in the various departments of the company can perform their operations upon a collaboration document 20 while viewing the most recent inventory information, as stored in the external database 12 and displayed in the collaboration document 20. Additionally, other external entities (not shown) similar to the external application 28 can view the most recent changes that are made by the departments of the company using the collaboration document 20. Such other entities can view the changes to the document 20 because the database/collaboration synchronizer 14 pushes the changes to the external database 12.

A collaborating user 24a-n of the collaboration group 22 can direct the database/collaboration synchronizer 14 to perform a save operation into the external database by way of the document collaboration system 16. In a preferred embodiment of the invention the ability to perform the save operation can be limited to the initiating user 24a-n. The collaborating user 24a-n performing the save operation can initiate it by depressing a save button 36. The save button 36 can be provided in the displays of the collaborating users 24a-n. In alternate embodiments, the save to the external database 12 can be performed by other functionalities including an event driven save or an automatic save functionality.

The database/collaboration synchronizer 14 can determine that the collaboration group 22 has requested a save operation by monitoring the document collaboration system 16 using the document status daemon 34. When the document status daemon 34 detects a request to save the collaboration document 20, the document status daemon 34 can receive the change from the collaboration group 22 and push it to the external database 12.

Thus, the data in the external database 12 is synchronized with the changes made to the collaboration document 20 by the collaborating users 24a-n of the requesting collaboration group 22. When the changes made by the collaboration group 22 are stored in the external database 12 in this manner they are recorded in the database log 26. Therefore, the changes made to the collaboration document 20 by the collaboration group 22 can be viewed by the external application 28, or any other applications that may be coupled to the external database 12.

Accordingly, in the foregoing manner, the document synchronization and collaboration solution 10 can maintain synchronization of the collaboration document 20 as viewed by the collaborating users 24a-n and the corresponding data in the external database 12. The database/collaboration synchronizer 14 can receive changes made to the collaboration document 20 by the collaboration group 22 and push them to the external database 12. Additionally, the database/collaboration synchronizer 14 can push changes made by the external application 28 to the document collaboration system 16. The document collaboration system 16 propagates the changes to the collaboration document 20 received from the database/collaboration synchronizer 14 to the collaborating users 24a-n of the collaboration group 22.

Figure 2:
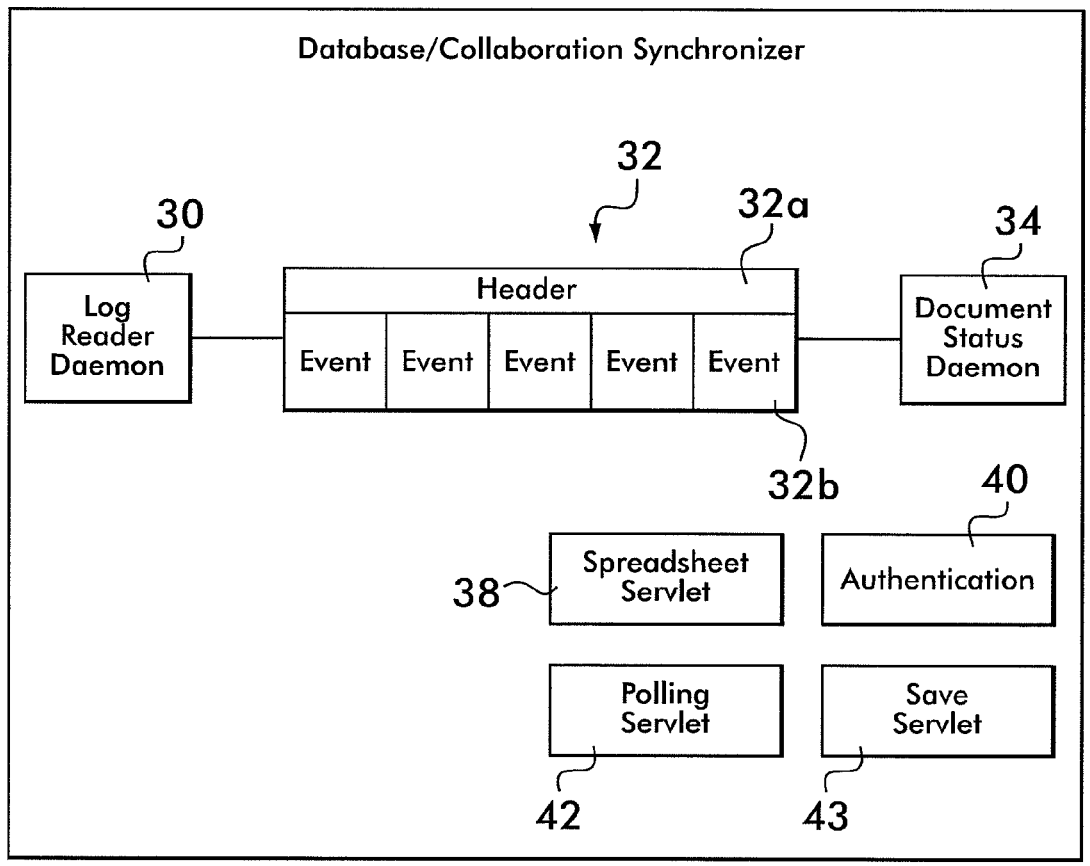
FIG. 2 is a more detailed block diagram representation of an embodiment of a database/collaboration synchronizer within the document collaboration and synchronization solution of FIG. 1.

Referring now to FIG. 2, there is shown a more detailed representation of an embodiment of the database/collaboration synchronizer 14 within the document collaboration and synchronization solution 10. The database/collaboration synchronizer 14 includes the client event queue 32 as previously described. The client event queue 32 can include a header 32a and an event list 32b.

The header 32a within the client event queue 32 can include information provided by the initiating user 24a-n, such as the feedname, the client IP address of the document collaboration system 16, and a document URL. The header 32a can also include any security token received during the initiation process, or the timestamp of the last time the document collaboration system 16 requested change event information from the database collaboration synchronizer 14. In a preferred embodiment of the invention the header 32a can indicate whether the client event queue 32 is a spreadsheet queue or a queue for some other type of collaboration document 20a-n. Furthermore, the header 32a can include any other information useful in facilitating the propagation of information between the external database 12 and the document collaboration system 16.

The event list 32b within the client event queue 32 can include an ordered list of the change events occurring within the external database 12 for the data displayed as the collaboration document 20 within the document collaboration system 16. Furthermore, the event list 32b can be empty if no change events are waiting to be pushed to the collaboration document 20.

The database/collaboration synchronizer 14 can create the client event queue 32 at the time an initiating user 24a-n registers for a collaboration session. In one embodiment of the invention, the initiating user 24a-n can provide the feedname corresponding to required document data when initiating a collaboration session, in order to obtain access to the document data when the user 24a-n is authenticated using the authentication block 40. The database/collaboration synchronizer 14 determines whether the feedname provided in this manner already exists within the client event queue 32. If the feedname does not exist in the client event queue 32 the synchronizer 14 can create a header 32 in the client event queue 32. The table name(s) corresponding to the feedname is previously defined in configuration data. The synchronizer 14 can then place the table name and feedname information into the client event queue 32. Thus, the manner in which the client event queue 32 stores these relationships permits the routing of changes through the database/collaboration synchronizer 14.

For example, the log reader daemon 30 can detect a change made to a table within the external database 12 that stores data displayed in the collaboration document 20. The database/collaboration synchronizer 14 can locate the table name of the changed table in the client event queue 32. The synchronizer 14 can thus use the corresponding feedname within the client event queue 32 to route the change made to the table in the external database 12 through to the collaboration document 20 within the document collaboration system 16. When the database/collaboration synchronizer 14 pushes the change event to the document collaboration system 16, it can delete the event from the client event queue 32.

In the preferred embodiment of the document collaboration and synchronization solution 10, the log reader daemon 30 can identify changes to the external database 12 by parsing the entries in the database log 26. The log entry information used by the log reader daemon 30 to extract the metadata from the database log 26 can include the table name and the type of update performed on the data. The table name can be translated into zero, one or more feednames based on the feeds provided by the initiating user 24a-n at the time of registration. The types of updates can include whether the change event is an insert, an update or a delete.

The metadata information extracted from the database log 26 by the log reader daemon 30 can include the primary key of the changed table, the number of columns in the changed table and the type of data contained in the columns. Each time the log reader daemon 30 parses the information within the database log 26 it can set a cursor to the point of the last entry in the database log 26 that is parsed. Thus, in a subsequent reading of the database log 26, the log reader daemon 30 can parse only the new log entries. When the log reader daemon 30 uses the cursor to find a new log entry, indicating a new change to the external database 12, it can translate the change event into a queue event and enter the queue event into the event list 32b of the client event queue 32 as previously described.

A queue event in the event list 32b can be represented as a data structure containing the key value of the changed row in the database table within the external database 12 that stores the corresponding data displayed in the collaboration document 20. The queue event data structure can also indicate whether the change is an insert, an update or a delete. Additionally, the queue event data structure can include only summary field values. Alternate embodiments of the client event queue 32 can include detail columns or any other information useful for propagating information between the external database 12 and the collaboration document 20.

In a preferred embodiment of the solution 10 the log reader daemon 30 places into the client event queue 32 only changes made to data that is being displayed in the collaboration document 20. Thus, the log reader daemon 30 can act as a filter for filtering changes made to the external database 12 by the external application 28. The determination whether change data is to be displayed in the collaboration document 20 can be made according to the table name or feedname provided by the initiating user 24a-n at the beginning of the collaboration session.

When the log reader daemon 30 places a queue event into the client event queue 32, the document status daemon 34 can determine that the collaboration group 22 is waiting for the change. If the document status daemon 34 determines that the collaboration group 22 is waiting for the change, the database/collaboration synchronizer 14 can push the change from the client event queue 32 to the collaboration document 20 within the document collaboration system 16 immediately. If a collaboration group 22 is not waiting, the change can remain on the client event queue 32 until the document the polling servlet 42 issues a polling request. When the polling servlet 42 issues the polling request, the database/collaboration synchronizer 14 can push the change to the collaboration document 20. In either case, the document collaboration system 16 can then propagate the change to the collaborating users 24a-n within the collaboration group 22. Thus, in this manner, the external application 28 can operate substantially as a virtual collaborating user 22 by the document collaboration and synchronization solution 10.

Similarly, the database/collaboration synchronizer 14 can use the relationships specified in the client event queue 32 to push changes made to the collaboration document 20 from the document collaboration system 16 to the external database 12. When a collaborating user 24a-n presses the save button 36, the document collaboration system 16 can initiate an HTTP message. The HTTP message from the collaborating user 24a-n informs the document status daemon 34 of the save request. In one embodiment the database/collaboration synchronizer 14 can include the save servlet 43.

The document status daemon 34 locates the feedname corresponding to the changed collaboration document 20 in the client event queue 32. The database/collaboration synchronizer 14 can then determine the corresponding table name within the external database 12 using the relationships stored in the header 32a of the client event queue 32. The database/collaboration synchronizer 14 can then propagate the change from the collaboration document 20 to the external database 12 according to the corresponding table name indexed to the feedname by the client event queue 32. Accordingly, the document collaboration and synchronization solution 10 can extend an RSS feed with real time change data polling and notification to the external database 12. Additionally, the solution 10 can provide the ability to change the external database 12 according to an RSS client while the RSS client receives changes from the external database 12.

In a preferred embodiment, a collaboration user 24*a-n* can make an HTTP request to the polling servlet 42 to await changes from the external database 12. The HTTP request can be a long polling request wherein the request remains open until the log reader daemon 30 identifies a relevant change to the data in the external database 12 or the HTTP request times out. A collaborating user 24*a-n* or an administrator of the database/collaboration synchronizer 14 can configure a timeout length for the polling request. If the log reader daemon 30 identifies a change prior to the timeout and places a corresponding queue event in the event list 32*b* of the client event queue 32, the polling servlet 42 can respond to the HTTP request with the change data. Additionally, the polling servlet can return to the client a list of keys for records that have changed, an indication of the type of change (insert, update, delete) and the new values for any summary fields. The document collaboration system 16 can update the document data of the collaboration document 20 according to the polling results.

In an alternate embodiment of the invention, the polling process may use a standard polling request in which a collaboration user 24*a-n* periodically generates an HTTP request and the generated HTTP request does not remain open. This type of polling can be referred to as short polling. In the short polling embodiment, the polling servlet 42 maintains the address of the collaboration user 24*a-n* sending the HTTP request, and initiates an HTTP response to that user 24*a-n* when the client event queue 32 contains changes to the external database 12. If a short polling request arrives when the client event queue 32 has no changes for the collaboration group 22, the database/collaboration synchronizer 14 can send a negative response to the collaboration group 22.

Figure 3:
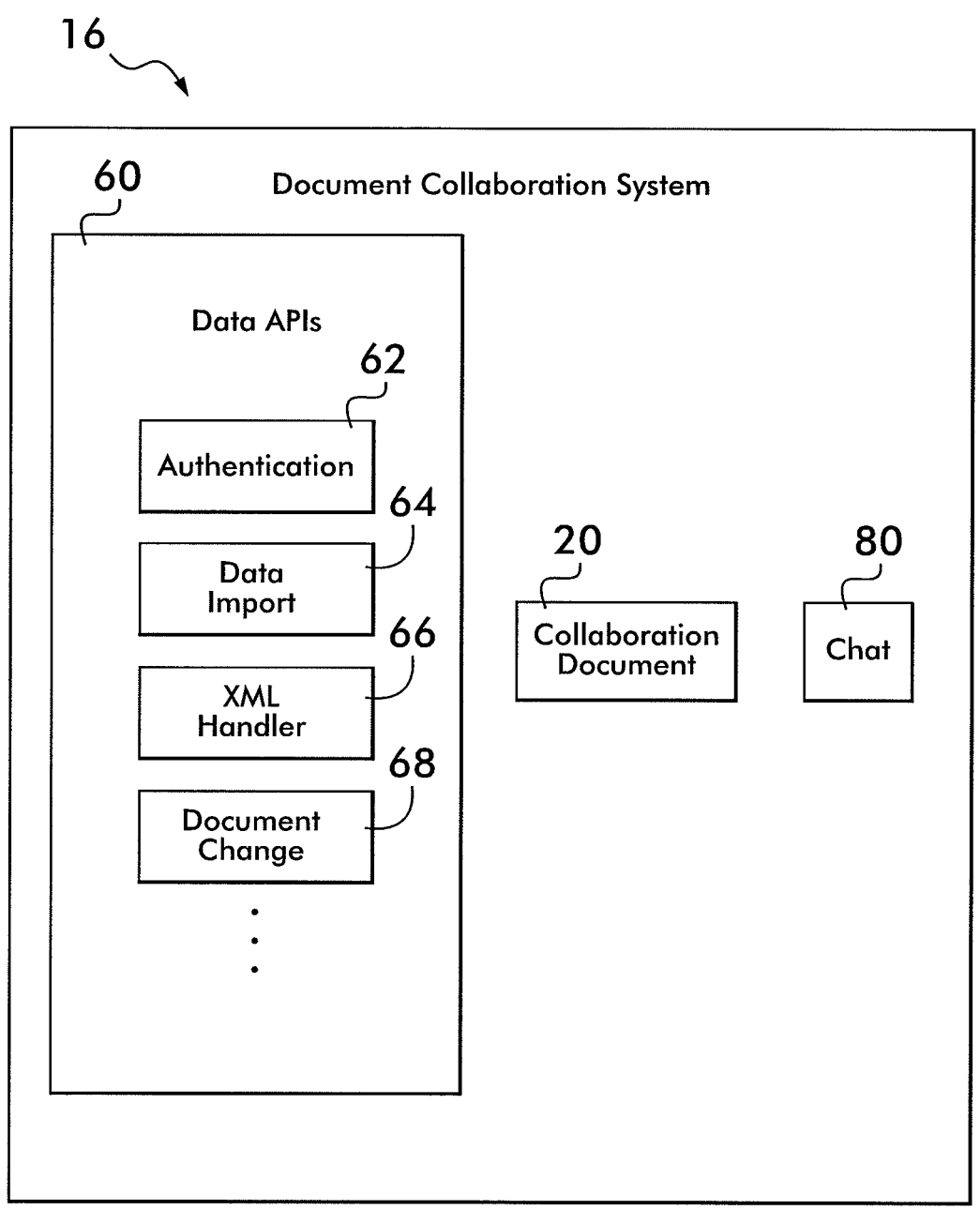
FIG. 3 is a more detailed block diagram representation of the embodiment of a document collaboration system of the document collaboration and synchronization solution of FIG. 1.

Referring now to FIG. 3, there is shown a more detailed block diagram representation of the document collaboration system 16 for permitting the collaborating users 24*a-n* to collaborate on a collaboration document 20. The collaboration document 20 can be a text document, a spreadsheet document, a form based html page document, or any other type of document. In a preferred embodiment of the document synchronization and collaboration solution 10, the document collaboration system 16 can be any system for synchronizing the changes made to any type of collaboration document 20 by the collaboration users 24*a-n*. For example, the document collaboration system 16 can be a system such as one of the application programs made available within the GOOGLE Docs suite of applications. Accordingly, the document collaboration system 16 can be the web based spreadsheet GOOGLE Spreadsheets. GOOGLE Spreadsheets is similar in functionality to other known stand alone spreadsheet applications such as Microsoft Excel. The GOOGLE Docs suite of applications is comparable to Microsoft Office.

The document collaboration system 16 can include the data application programming interfaces (APIs) 60 for use by programmers who create web based applications such as an application implementing the document collaboration and synchronization solution 10. Accordingly, the data APIs 60 are a software toolkit that can be used by the solution 10 to assist in the exchange of information between the database/collaboration synchronizer 14 and the document collaboration system 16. Within GOOGLE Docs the data APIs 60 can be referred to as the GData APIs. Documentation for the GData APIs can be found at http://code.GOOGLE.com/apis/gdata/. Documentation for GOOGLE Spreadsheet data API can be found at http://code.GOOGLE.com/apis/spreadsheets/developers_guide_protocol.html#AuthSubHTTP The data APIs 60 within the document collaboration system 16 can include, for example, an authentication method 62 for use with the authentication block 40 in the synchronizer 14 when initiating a collaboration session. The authentication process can include providing the initiating user 24*a-n* with a security token for storage in the header 32*a* of the client event queue 32 when the initiating user 24*a-n* registers. As part of the registration process the initiating user 24*a-n* can also provide the URL and the feed for storage in the header 32*a*. The feed can include a feedname, a table name or a key range. Furthermore, a table may be defined to be part of zero, one or more feeds. The key range can be a low key, a high key or a list of keys. The feed can also include summary fields which can include one or more columns from the table.

The data APIs 60 can also include a data import method 64. The document status daemon 34 and the document collaboration system 16 can use the data import method 64, for example, in populating the collaboration document 20 with data from the external database 12. Additionally, the XML handler method 66 can format and transmit XML messages between the synchronizer 14 and the document collaboration system 16. For example, the document change method 68 can issue an HTTP message when a collaborating user 24*a-n* presses the save button 36 to signal a save servlet 43 within the synchronizer 14 that the user 24*a-n* has requested a save operation for saving a version of the collaboration document 20. The document status daemon 34 can receive the change from the document collaboration system 16 and push the changes made to the collaboration document 20 onto the client event queue 32 for propagation to the external database 12, in response to the HTTP messages issued by the document change message 68.

Furthermore, those skilled in the art will understand that any number of additional methods having any useful functionalities may be provided within the data APIs 60 of the document collaboration system 16. Additionally, those skilled in the art can revise a web server program implementing the document collaboration and synchronization solution 10 to make use of any additional APIs 60 provided in the document collaboration system 16 whenever they are available.

In one preferred embodiment of the invention, the data APIs 60 can use standards such as the Atom 1.0, the RSS 2.0 syndication formats and the Atom Publishing Protocol as understood by those skilled in the art. The feeds of the data APIs 60 can conform to and be extended in conformity to these standards. This permits application programmers to use standardized commands within a web based program implementing the solution 10 to push information to or pull information as required, thereby facilitating their work. Because the GData framework of GOOGLE Docs can use standard HTTP and web syndication protocols, it is possible to transmit data requests and responses using traditional syndication aggregators/feed readers, JavaScript/AJAX based clients in a web browser, stand alone applications and various other systems. A programmer can use any programming language that allows sending of HTTP requests and handling of XML based responses for synchronization of collaboration document 20 and the external database 12 data to implement the solution 10.

The RSS feed names in the document collaboration and synchronization solution 10 are defined in configuration data that includes, for example, the table name or view name, the primary key columns used to uniquely identify a row of data, and the columns that are defined to be summary fields. Other columns can be considered to be detail data, an optional key range, or a filter predicate that restricts the feed definition to certain rows of the table or view.

The document collaboration system 16 can also provide a chat feature 80 for the collaboration users 24a-n. In order to allow the collaborating users 24a-n to access the chat feature 80, their displays can have a chat button for opening a chat window on their displays. Using the chat windows on their displays, the collaborating users 24a-n can see who else is collaborating on a collaboration document 20 during a collaboration session. Additionally, the collaborating users 24a-n can chat with the each other using the chat windows.

Figure 4:
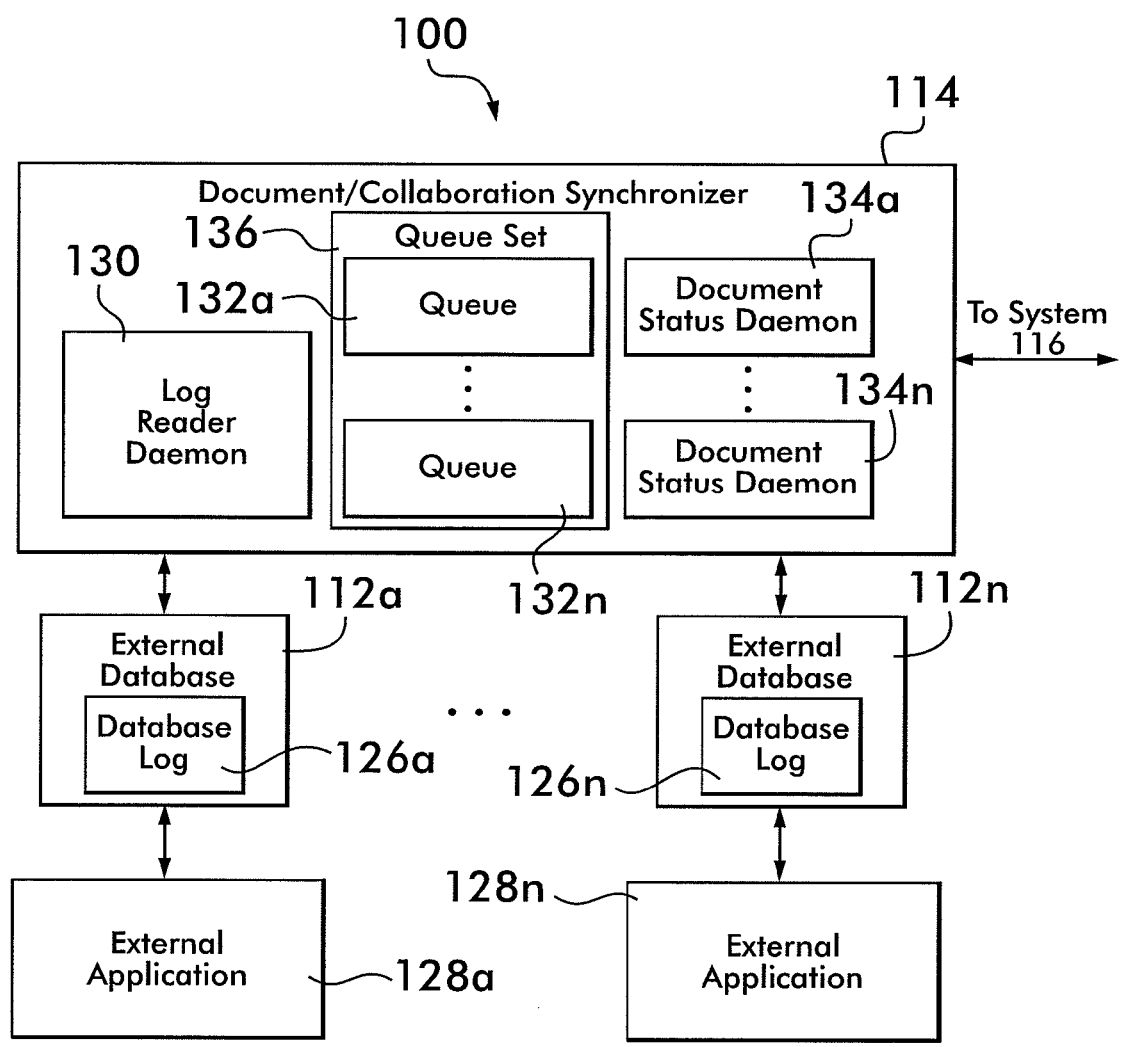
FIG. 4 is a block diagram representations of an alternate embodiment of the document collaboration and synchronization solution of FIG. 1 including synchronization of multiple collaboration documents.
Figure 5:
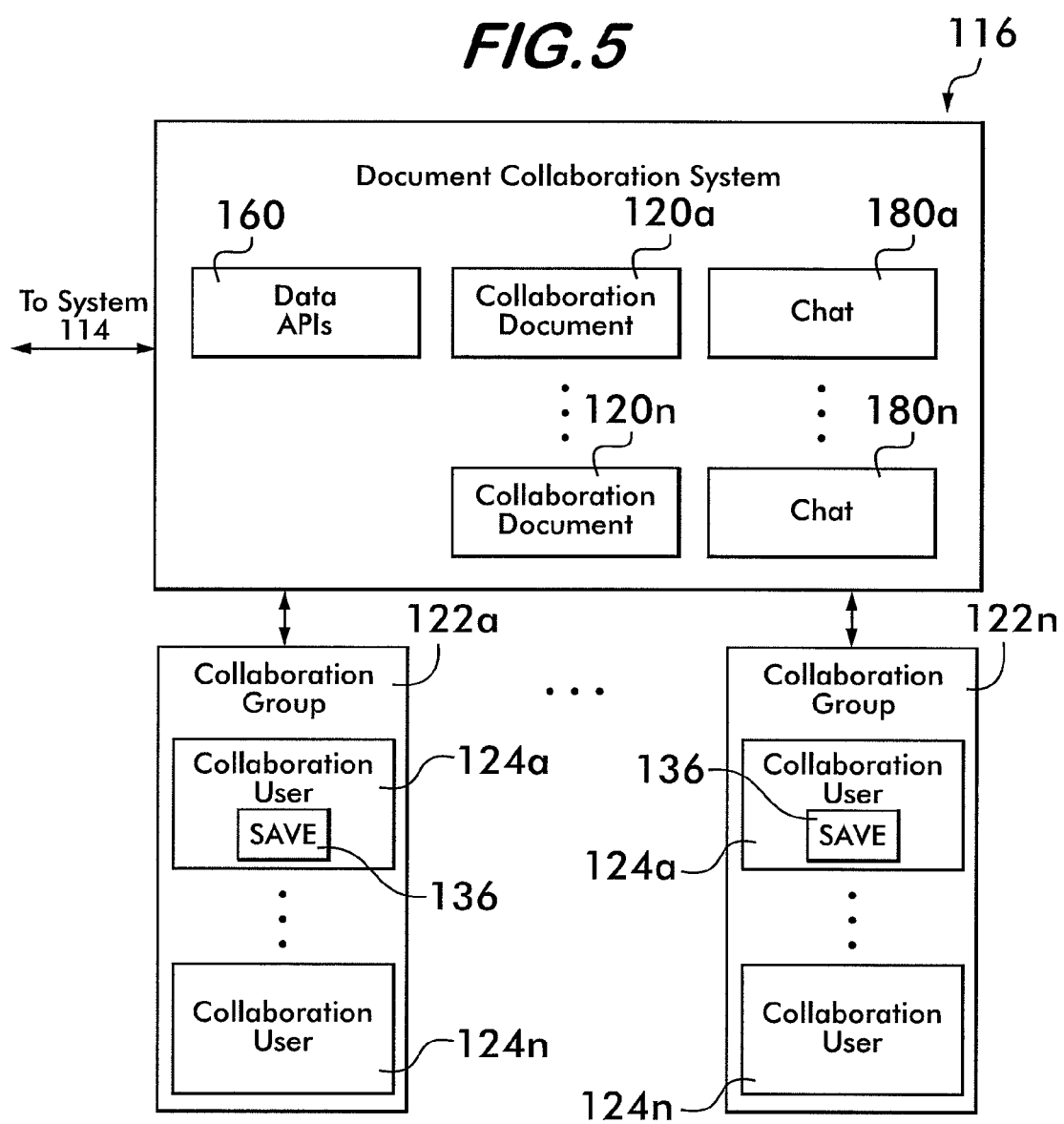
FIG. 5 is a block diagram representations of an alternate embodiment of the document collaboration and synchronization solution of FIG. 1 including synchronization of multiple collaboration documents.

Referring now to FIGS. 4, 5, there is shown an embodiment of the document collaboration and synchronization solution 100. The document collaboration and synchronization solution 100 is an alternate embodiment of the document collaboration and synchronization solution 10. Within the solution 100, multiple collaboration groups 122a-n can collaborate on their respective collaboration documents 120a-n during their respective collaboration sessions. The document collaboration system 116 within the solution 100 can individually supervise each of the collaboration groups 122a-n as previously described. In a preferred embodiment of the document collaboration and synchronization solution 100, the document/collaboration synchronizer 114 can synchronize multiple external databases 112a-n storing the data displayed in the collaboration documents 120a-n.

The document collaboration system 116 can supervise the editing and synchronizing of the collaboration document 120a as the collaborating users (not shown) within the collaboration group 120a view and modify it as previously described. Thus, all of the collaborating users within the collaboration group 122a can simultaneously view a synchronized version of the collaboration document 120a showing all of the changes made by the users during the collaboration session. Each of the collaboration groups 122a-n can have its own chat feature 180a-n for communication with the collaborating users therein.

Each collaboration document 120a-n in the solution 100 can have its own URL entered by the initiating user at the time of registration. The initiating user of each collaboration group 122a-n can start its document status daemon 134a-n within the document/collaboration synchronizer 114 for detecting changes in its collaboration document 120a-n at the time of registration. In an alternate embodiment (not shown) a single document status daemon 134a-n can detect the changes made to multiple collaboration documents 120a-n or to all of the collaboration documents 120a-n.

Each collaboration group 122a-n can also have its own client event queue 132a-n. Each client event queue can have its own header and its own event list. The client event queues 132a-n in the document/collaboration synchronizer 114 can form a queue set 136. The client event queues 132a-n within the queue set 136 can propagate changes made to each of the collaboration documents 120a-n, respectively, through to the external databases 112a-n. Additionally, the client event queues 132a-n can route changes made to the external databases 112a-n through to the corresponding collaboration documents 120a-n. The structure of the queue set 136 thus permits rapid lookups by the log daemon 130 and the polling servlet to facilitate propagation in both directions through the document/collaboration synchronizer 114. When the document collaboration and synchronization solution 100 begins operation, the queue set 136 can be empty. The first client event queue 132a-n can be created when an initiating user within the first collaboration group 122a-n registers. Thus, the size of the queue set 136 can increase or decrease as collaboration groups 122a-n log on, log off or time out.

Each client event queue 132a-n can begin in an empty state at the time of registration by its initiating user. The client event queue 132a-n maintains its header information regardless of the presence of events. The key <Feedname, address> can index the queue set 136. Nested java hash maps can implement the <Feedname, address>. In a preferred embodiment of the invention the outer hash map can be a hash map of [key=feedname, value=an inner hash map of [key=client address, value=queue header 32]]. In an alternate embodiment of the invention (not shown) the document collaboration and synchronization solution 100 can include a single events/client queue 132a-n for synchronizing the external databases 112a-n and the collaboration documents 120a-n.

The data APIs 160 within the document collaboration system 116 can detect a change made to a collaboration document 120a-n and generate an HTTP message containing the feednames to the changed collaboration document 120a-n accordingly. The corresponding document status daemons 134a-n can receive the HTTP message and place the change into the client event queue 132a-n of the changed collaboration document 120a-n. Using the information stored in the client event queue 132a-n, including the relationships between the table names and the feednames, the document/collaboration synchronizer 114 can determine the corresponding table or tables and transmit the change to the correct external database 112a-n or external databases 112a-n.

The log reader daemon 130 of the database/collaboration synchronizer 114 can read the records within the database logs 126a-n of any number of external databases 112a-n within the solution 100. Based on the names of the tables having changed data as indicated by the log records in the database logs 126a-n, the log reader daemon 130 can determine whether there are any feednames corresponding to the table in the queue set 136. Therefore, the log reader daemon 130 can determine whether any collaboration group 122a-n is waiting for the changed data. If any collaboration group 122a-n is waiting, the log reader daemon 130 creates a client event and pushes it onto the event list of the correct client event queue 132a-n.

Thus, when the log reader daemon 130 detects changes to the data in the external databases 112a-n it can push the changes to the collaboration documents 120a-n displaying the changed data according to the relationships stored in the client event queues 132a-n. In a preferred embodiment of the invention, a change which is pushed onto multiple client event queues 132a-n for multiple collaboration groups 122a-n can be saved as a single instance within the queue set 136. References to the single instance of the change can be provided for each client event queue 132a-n where the change is to be pushed. When the change is pushed to all of the collaboration groups 122a-n waiting for it, the synchronizer 114 can delete the instance.

Each external database 112a-n can have its own external application 128a-n for making changes to data stored within itself. Additionally, in a preferred embodiment of the invention, each external application 128a-n can view the data and make changes in any of the remaining external databases 112a-n. Furthermore, it will be understood by those skilled in the art that the external applications 112a-n can perform their operations upon the external databases 112a-n at any time, regardless of whether the collaboration groups 122a-n are actively collaborating upon any collaboration documents 120a-n.

Figure 6:
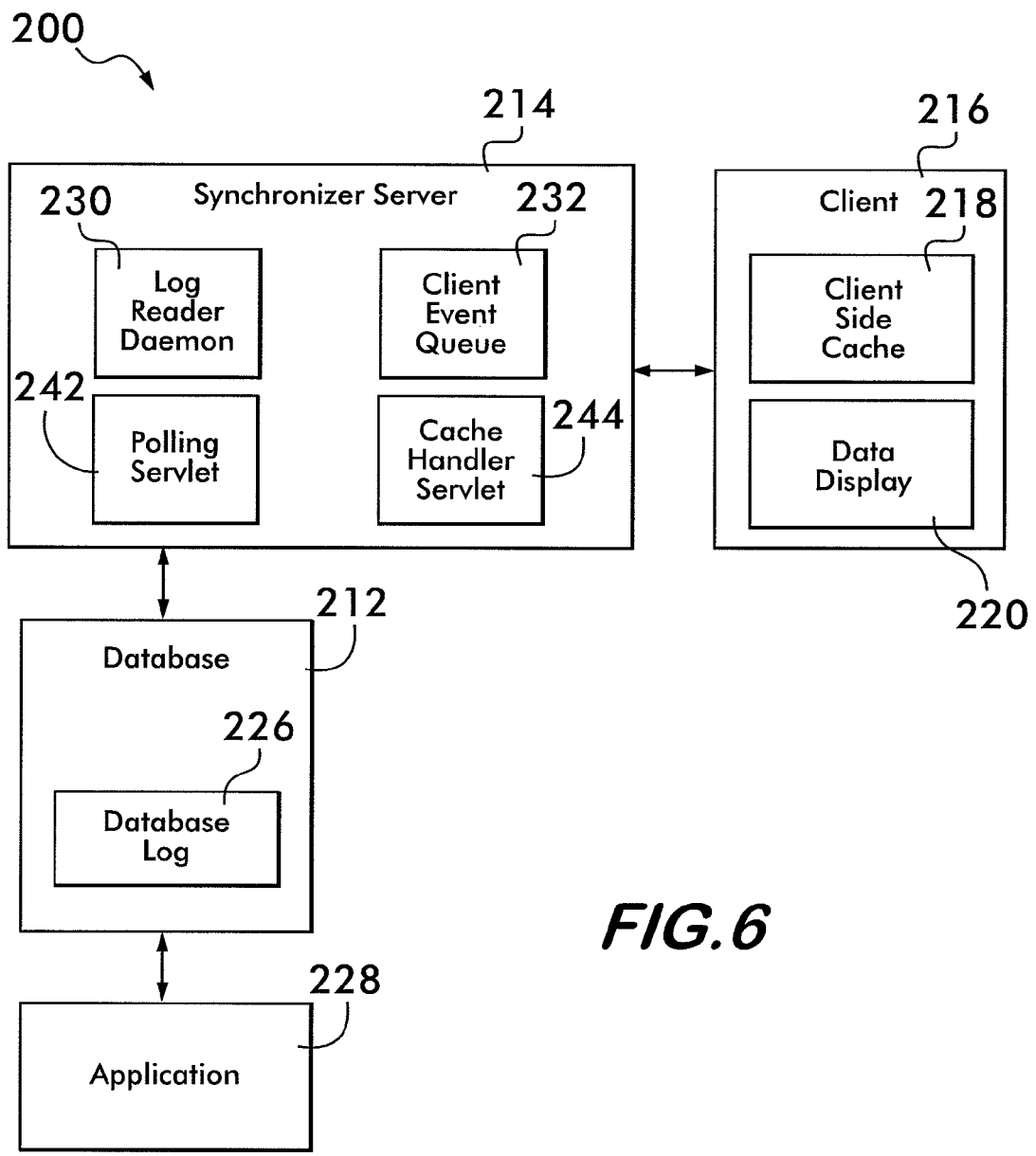
FIG. 6 is a block diagram overview of an embodiment of the client side caching synchronization system.

Referring now to FIG. 6, there is shown a block diagram representation of an embodiment of the client side caching synchronization system 200. A user of the document collaboration and synchronization solution 10 can use the client side caching synchronization system 200 in connection with the document collaboration and synchronization solution 10 for improving the efficiency of the document collaboration and synchronization solution 10. In an alternate embodiment of the client side caching synchronization system 200 a user of any other web server application can use the client side caching synchronization system 200 to improve the efficiency of the web server application.

Within the client side caching synchronization system 200, a client 216 can display data on a data display 220. The data displayed in the data display 220 can be stored in a client side cache 218 within the client 216. The data display 220 can include data stored in a database 212 and transmitted to the client 216 from the database 212 by way of a synchronizer server 214 for display on the data display 220. An application 228, coupled to the database 212, can alter the transmitted and cached data after transmission to the client 216 and while the data display 220 displays it. When the application 228 changes data in the database 212 which has been transmitted to the client 216 for display, the synchronizer server 214 can push the database changes to the client 216. Thus, the data display 220 within the client 216 can display the most recent version of the data stored in the database 212. While the display data can be displayed in a human perceivable form, it will be understood that the display data can include any data suitable for display in such a form, whether it is actually displayed or not.

The synchronizer server 214 can include a log reader daemon 230 for reading a database log 226 within the database 212 in order to detect the changes to the data in the database 212. The synchronizer server 214 can enter a change event into a client event queue 232 when the log reader daemon 230 detects a change to data that has been transmitted to the client 216. In a preferred embodiment the server 216 can detect such changes to the transmitted data according to the key/value pairs of the transmitted data. The key/value pairs of the transmitted data can be known to the server 214 according to feedname information originally provided by the client 216 in order to obtain the data from the database 212 for display on the data display 220. The synchronizer server 214 can include a cache handler servlet 244 that can manage the determination whether requested data already exists in the client side cache 218. The server 214 can push a change event stored in the client event queue 232 to the client 216 in response to long polling of the client event queue 232. A polling servlet 242 within the server 214 can manage the polling operations of the server 214.

The database 212 can include summary information and detail information in a manner well known to those skilled in the art. When the client 216 originally requests data from the database 212 the synchronizer server 214 can transmit only the summary information in one embodiment of the invention. For example, in a stock listing, for each stock symbol the summary information can be the current stock price and fifty-two week high and low prices. Detailed information can be the annual report for the company or other news about the company. Accordingly, the client side cache 218 may store only summary information when the display of data by the data display 220 begins. If the client 216 later requests detail information corresponding to the cached summary information, the synchronizer server 214 can obtain the detail information from the database 212 and transmit it to the client 216. However, if the server 214 retransmits any previously transmitted summary information along with the new detail information, the efficiency of the servicing of the requested information can be compromised.

Therefore, in response to a request for transmission of detail information from the database 212 the synchronizer server 214 can determine whether any summary information requested along with the new information is already present in the client side cache 218. When the synchronizer server 214 determines that data requested by the client 216 includes data that is already stored in the client side cache 218, it can transmit only the data which is not already stored. The cache handler servlet 244 can manage the selective transmission of data to the client 216 to prevent retransmission of the data already present in the supply side cache 218.

Furthermore, the cache handler servlet 244 can determine whether the data requested by the client 216 is already present in the client side cache 218, and selectively transmit new data to the client 216, regardless of any reasons why the new data was not previously transmitted to the client 216. Accordingly, the operations of the synchronizer server 214 for increasing the efficiency of the client side caching synchronization system 200 are not limited to cases where the new data is not detail data associated with previously transmitted summary data.

In a preferred embodiment of the invention, the client 216 can have a list of key values along with summary information for each key value in the client side cache 218. If there is a need to access summary information, the data is already in the cache and no request is generated to the synchronization server 214. If detailed data is needed, then a request is generated for detailed data. Depending on the size of detailed data, the client 216 may also cache the detailed data in case it is required again. The client 216 can poll the server 216 for changes. When data changes in the database 212, the key and summary data are sent to the client. If a data value changes multiple times between poll requests, only the most recent value is sent to the client 216. This can reduce data transmission volume for frequently changing data. Changes in detailed data are not sent on a poll request to reduce the size of the transmission. An indication that detailed data has changed can be sent and this can result in any cached detailed data being invalidated or discarded in the client side cache 218. If the client needs to access the detailed data, then the detailed data is retrieved from the server 214 only if required.

In a preferred embodiment of the client side caching synchronization system 200, the client side cache 218 can be based on a Javascript Object Cache (JSOC) framework. Therefore, the client side cache 218 can store data as javascript object references for fast retrieval. Additionally, the client 216 can be a conventional client browser 216. The client browser 216 can store the javascript object references within the client side cache 218 using Javascript Object Notation (JSON) strings. The JSON strings within the client side cache 218 can represent the key/value pairs for the transmitted data.

For some data within the client side cache 218 the JSON strings can represent both the key and the value of the data stored. For other data in the client side cache 218, the JSON strings can contain only the key. When the client browser 216 requests additional data from the database 212 the client browser 224 can check the client side cache 218 to determine whether the value associated with the key of the additional data is present. If the cache 226 contains both a key and a value, the web browser 224 use the value corresponding to the requested key. If the corresponding value is not stored in the client side cache 218 the client 216 can make a request to the cache handler servlet 244. The cache handler servlet 244 can then retrieve the data from the database 212. The log reader daemon 230 can then return the most current data value associated with the named key to the client browser 216.

Figure 7:
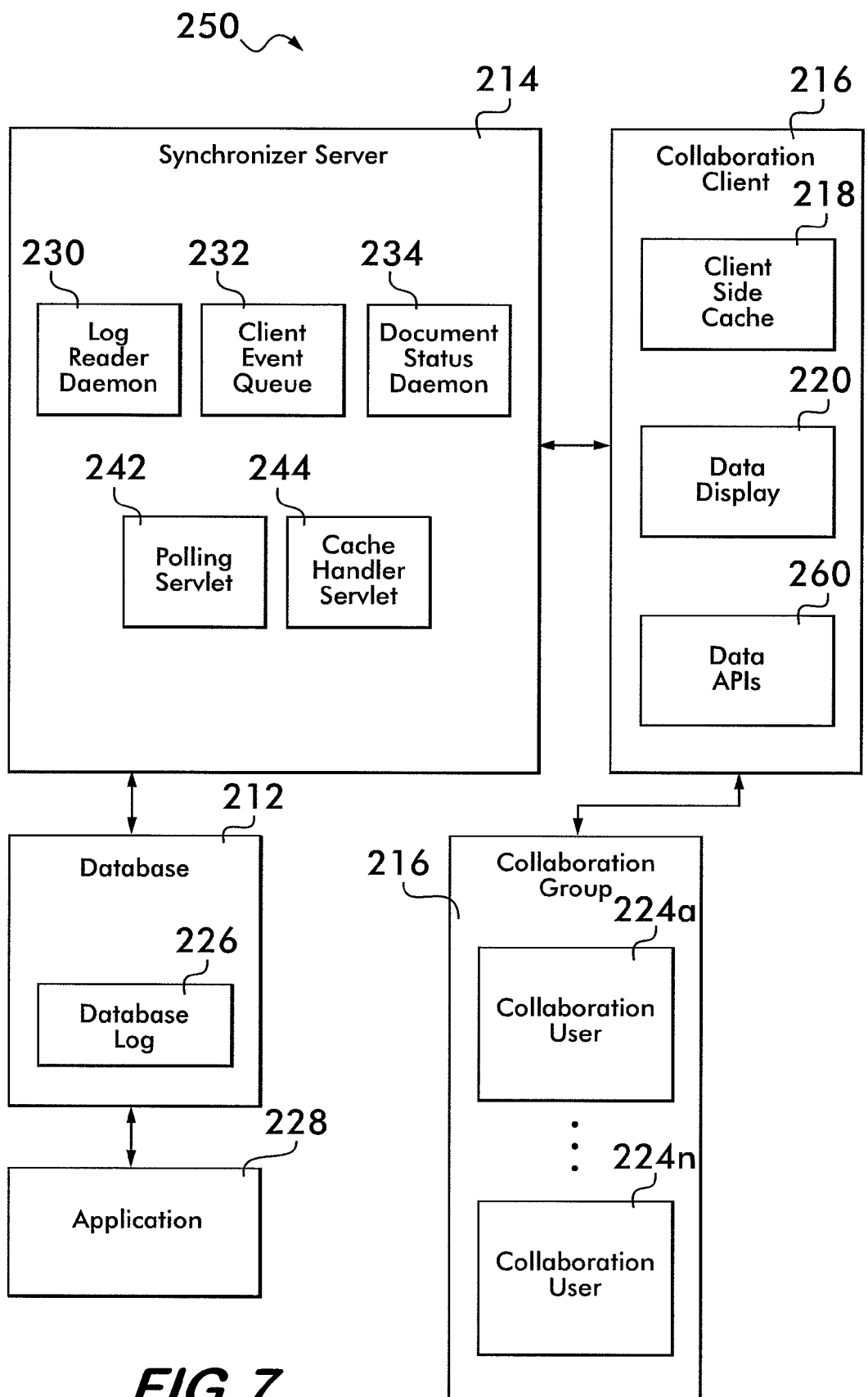
FIG. 7 is a block diagram overview of an alternate embodiment of the client side caching synchronization system of FIG. 6.

Referring now to FIG. 7, there is shown a block diagram representation of an embodiment of the document collaboration and synchronization solution 250. Within the document collaboration and synchronization solution 250, a user of the document collaboration and synchronization solution 10 can use the client side caching synchronization system 200 in connection with the document collaboration and synchronization solution 10 for improving the efficiency of the document collaboration and synchronization solution 10. In an alternate embodiment of the client side caching synchronization system 200 a user of any other web server application can use the client side caching synchronization system 200 to improve the efficiency of the web server application.

In the document collaboration and synchronization solution 250 multiple collaboration users 224a-n can collaborate on the data cached in the client side cache 218 and displayed in the data display 220. The collaboration client 216 can synchronize changes made to the data display 220 by the collaboration users 224a-n in order to display the changes to all of the collaboration users 224a-n. The document status daemon 234 can detect changes made to the display data 220 by the collaboration users 224a-n using HTTP messages from the data APIs 260 and push the changes to the database 212. The synchronizer server 214 can push changes made to the data in the database 212 to the data display 220 by way of the client event queue 232.

While the invention has been described in detail and with reference to specific examples thereof, it will be apparent to one skilled in the art that various changes and modifications can be made therein without departing from the spirit and scope thereof.

What is claimed is:

1. A method for synchronizing a database with data stored at clients, comprising:
    receiving a collaboration change to a collaboration document from a collaboration user from among a plurality of collaboration users in multiple collaboration groups at said clients;
    caching said collaboration change in a client side cache to provide client side cached data at said client;
    pushing said cached data to update said collaboration document displayed to said plurality of collaboration users, wherein said collaboration document is a synchronized collaboration document that is synchronized based on any updates provided by said plurality of collaboration users and said database;
    saving said collaboration change from said cached data in said database;
    receiving by said database a first, new database change from an external application that is external to said database and to said client while said plurality of collaboration users are collaborating on said collaboration document, wherein said database, said collaboration document, and said external application are separate, and wherein said external application provides a second new database change while said collaboration users are not collaborating on said collaboration document;
    pushing said second, new database change to a set of client event queues for said plurality of collaboration users in said multiple collaboration groups at said clients, wherein said second, new database change is saved as a single instance within said set of client event queues, and wherein a reference of said single instance is provided to each of said client event queues in said set of client event queues;
    pushing said second, new database change to said plurality of collaboration users in said multiple collaboration groups at said clients; and
    in response to said pushing, deleting said single instance.

2. The method for synchronizing a database of claim 1, further comprising detecting said new database change in accordance with a long polling operation.

3. The method for synchronizing a database of claim 1, further comprising detecting said new database change in accordance with a short polling operation.

4. The method for synchronizing a database of claim 1, wherein said determining whether said further data includes data of said client side cached data comprises determining by a cache handler servlet.

5. The method for synchronizing a database of claim 4, further comprising determining whether data includes said client side cached data according to key/value pairs of said client side cached data.

6. The method of synchronizing a database of claim 1, said database includes summary data and associated detail data and wherein said received data comprises received summary data.

7. The method for synchronizing a database of claim 6, wherein said further data comprises detail data associated with said received summary data.

8. The method for synchronizing a database of claim 1, further comprising pushing a change event to said client side cached data.

9. The method for synchronizing a database of claim 8, further comprising polling to detect said new database change said synchronizer server by a polling servlet of said synchronizer server.

10. The method for synchronizing a database of claim 9, further comprising updating said client side cached data by way of a data structure.

11. The method for synchronizing a database of claim 10, wherein said data structure comprises a queue.

12. The method for synchronizing a database of claim 1, further comprising displaying said displayed collaboration document in a browser.

13. The method for synchronizing a database of claim 12, further comprising: providing an HTTP save message by a collaboration user of said one or more collaboration users; and
    pushing said data of said collaboration document in response to said HTTP save message.

14. The method for synchronizing a database of claim 13, further comprising creating a change event in accordance with a feedname of said displayed collaboration document.

15. The method for synchronizing a database of claim 1, further comprising providing a data feed by said client to receive data from said database and provide received data, wherein a feedname corresponds to a table in said database.

* * * * *